Nov. 5, 1940.    W. E. WHITE    2,220,563
MEASURING APPARATUS
Filed Sept. 10, 1938
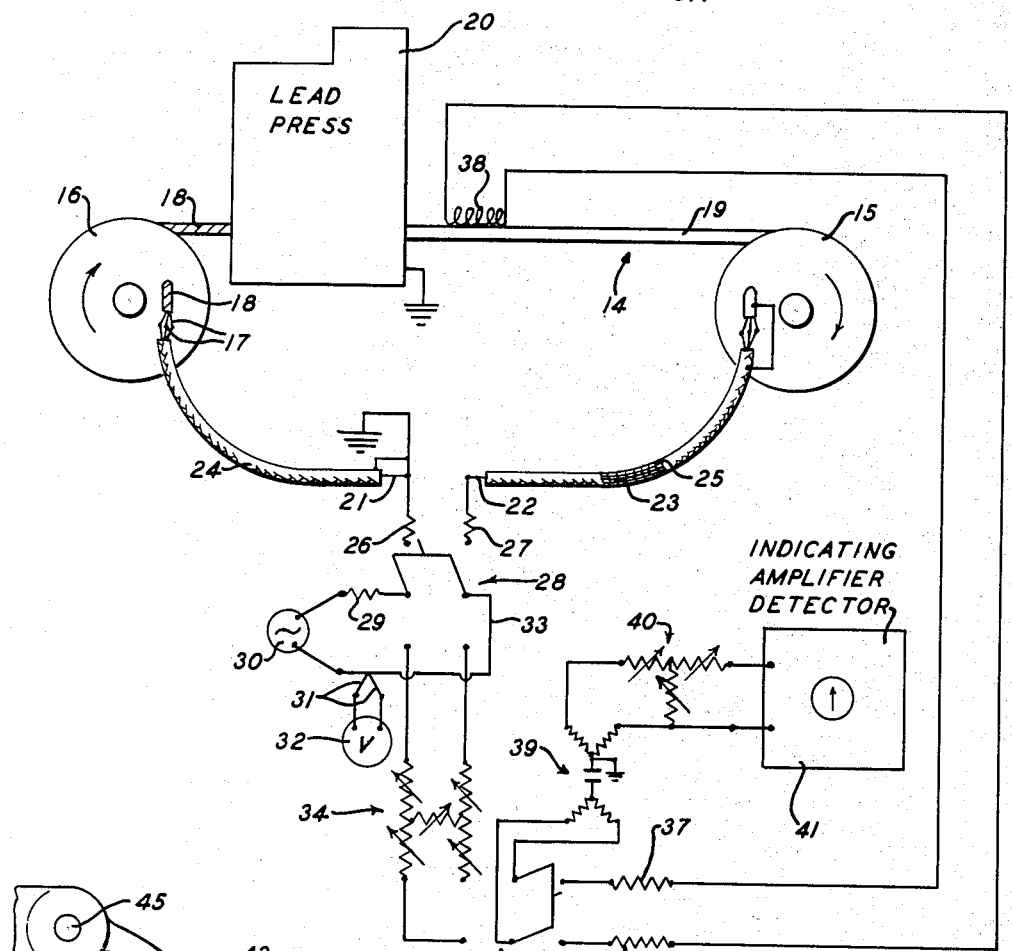
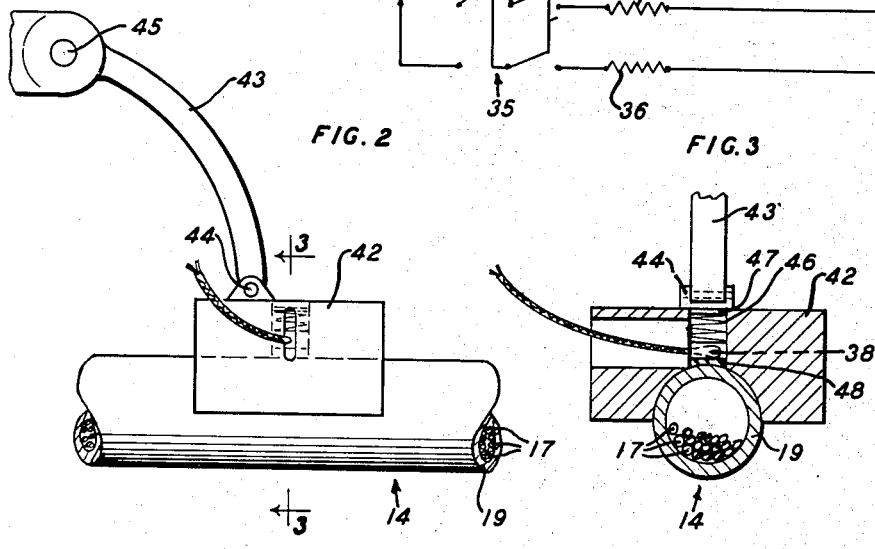
INVENTOR
W. E. WHITE
BY
E. R. Nowlan
ATTORNEY Patented Nov. 5, 1940

2,220,563

UNITED STATES PATENT OFFICE 2,220,563

MEASURING APPARATUS

Walter E. White, Montreal, Quebec, Canada, assignor to Western Electric Company, Incorporated, New York, N. Y., a corporation of New York Application September 10, 1938, Serial No. 229,392

7 Claims. (Cl. 175—183)

This invention relates to a measuring apparatus and more particularly to an apparatus for measuring variations in the thickness of metallic sheet material, especially the extruded lead or lead alloy used as a sheath on electrical conductor cables in the communications arts.

A great amount of multiple conductor cable is manufactured annually for use in the communications arts and especially in the telephone art, in which a core, which may comprise a number of independently insulated copper wires twisted together and ordinarily covered with an insulating layer such as a tape or ribbon of paper wound over the core, has over this paper insulation a seamless sheath of lead or lead alloy formed by extruding the metal over the core. This extrusion to form the sheath is ordinarily done by passing the core through a suitably constructed extrusion press from which the finished sheathed cable issues. Variations in the thickness of the extruded sheath both below and above the optimum desired thickness may occur due to changes in the temperature of the metal being extruded or from other causes. It is important to be able to detect such variations while the extrusion process proceeds in order that the variations may be kept between permissible limits.

An object of the present invention is to provide an apparatus which will automatically detect and indicate variations in the thickness of a sheet of metallic material particularly adapted to operate on an extended portion of sheet material which is in substantially continuous advancing motion.

With the above and other objects in view, one embodiment of the invention may present an apparatus for use in connection with an extrusion press for forming a seamless lead sheath on a conductor core, which apparatus comprises means to pass alternating electric current of relatively high frequency through the conductors of the cable, a search coil preferably stationary in the immediate vicinity of the advancing sheathed conductor to be electrically affected by the alternating field which advances with the conductors, means to detect and amplify variations in the electrical state of the coil, and indicating means to be actuated by the detecting and amplifying means, preferably together with means whereby the apparatus described may be calibrated by the use of a standard sample of sheathed conductor.

Other objects and features of the invention will appear from the following detailed description of an embodiment thereof in an apparatus constructed in accordance with the invention to detect and indicate variations in the thickness of the sheet being formed on a conductor cable by an extrusion press taken in connection with the accompanying drawing in which the same reference numerals are applied to identical parts in the several figures, and in which Fig. 1 is a diagrammatic representation of an apparatus constructed in accordance with the invention and applied to a cable sheathing extrusion press;

Fig. 2 is an enlarged detached detail view in side elevation of the search coil of the apparatus and its mounting; and Fig. 3 is a sectional view on the line 3—3 of Fig. 2.

In the embodiment of the invention herein disclosed an extrusion press is indicated at 20 which may be of any approved construction and mode of operation for the purpose of extruding a sheath 19 of lead or suitable lead alloy upon a core 18 comprising a plurality of conductor strands 17, the core being fed to the lead press from supply means such as a reel 16 and the finished sheath cable 14 being wound on a take-up reel 15. Preferably the reels 15 and 16 are provided with means whereby the inner end of the core on the reel 16 and of the core and the sheath of the cable on the reel 15 may be electrically connected to any desired external electrical element. Means for doing this are old and well known in the art of manufacturing conductor strands and cables and hence it is not thought to be necessary to describe such means in detail here.

All or a majority, preferably not less than nine-tenths, of the conductor strands of the core on the reel 16 are connected in parallel, through the means just referred to, to a conductor strand 21. In the same way the other ends of the conductor 17 are connected from the inner end of the cable on the reel 15 to a conductor strand 22. The strands 21 and 22, ordinarily of copper, are insulated, as shown at 23, with a suitable electrical insulating sheath, for example of braided cotton, which may also be enameled if desired. Over this electrical insulating sheath 23, each of the two conductors 21 and 22 is further provided with an electrical shield, 24 and 25 respectively, preferably made by braiding a plurality of fine copper wires over the insulating sheath of the conductor. The shield 25 is connected at the reel 15 to the sheath 19 of the cable 14. The sheath 19 being formed by a metal die which is part of the press 20 is electrically connected to the press and the press itself is electrically connected to ground so that the press 20, the sheath 19 and the shield 25 are all grounded at the press. The conductor 21 is also connected to a resistance 26; and the resistance 26, the conductor 21, and the shield 24 are all grounded in any suitable manner substantially at their mutual junction. The conductor 22 is connected to a resistance 27. The resistances 26 and 27 are connected, respectively, to the two binding posts on one side of a double pole, double throw switch 28. The middle terminal of the switch 28 on the same side as the resistance 26 is connected through a resistance 29 to one side of a suitable vacuum tube oscillator 30, the other side of which is connected by a conductor 33 to the other middle terminal of the switch 28. At a point on the conductor 33 electrically opposite the resistance 29 the conductor 33 is secured to or in contact with the hot terminal of a thermocouple 31, to which thermocouple is connected a meter 32 to detect and indicate the magnitude of the current flowing in the conductor. The remaining two terminals of the switch 28 are connected to the input terminals of an attenuator 34, the output terminals of which are connected to one pair of outer terminals of a double pole, double throw switch 35. The other outer terminals of the switch 35 are connected, respectively through resistances 36 and 37, to a search coil 38. The middle terminals of the switch 35 are connected through a coupling 39 and an attenuator 40 to an indicating amplifier detector device 41 which may be of any suitable and appropriate construction and mode of operation. A great variety of such devices whose purpose is to detect, amplify and indicate variations in small electrical currents is to be found commercially in the market and it is not thought that it is necessary to describe the construction and operation of such a device here, as these are familiar to all those skilled in the electrical arts.

It is self evidently important that the search coil 38 be mounted and related to the cable in such a way that as the cable passes along under the coil the distance between the coil and the outer surface of the sheath to which it is applied shall remain substantially invariable. A simple means of effecting this is disclosed particularly in Figs. 2 and 3. In Fig. 2 the cable 14 is presumed to be moving toward the right in the direction of the arrow from the press. A block 42 preferably of some suitable electrical insulating material, for example of hard wood, is formed in its under-side with a tranversely arcuate groove dimensioned to fit substantially the transverse curvature of the cable. This block may be supported, for example by means of an arm 43 pivoted at 44 to the block and at 45 to any suitable supporting member, to ride stationarily on the advancing cable. The block is provided with a vertical bore whose axis intersects the axis of the cable and of a size to conveniently receive and hold the search coil 38, and with a slot to pass the leads of the coil. A spring 46 in the bore abutting at its lower end against the top of the coil 38 and at its upper end against a stop member 47 secured in any suitable manner in the block 42, serves to press the coil 38 down toward the cable. To prevent the coil 38 from being injured by the heat and friction of the cable sheath 19 a thin disk 48 of some suitable material, such as a hard fibre for example, transversely curved on its under-side to approximately fit the contour of the sheath is interposed between the sheath and the coil. Ordinarily the weight of the block 42 and the arm 43 will be sufficient to maintain the coil in suitable relation to the sheath. However, if desired a suitable weight may be placed on top of the block 42 to insure the constant approximation of the coil to the sheath.

To illustrate the operation of the apparatus a particular case will be assumed, although the invention is not limited in any way to the specific dimensions and other specifications used in connection with this illustration of the operation. In a particular case the nominal thickness of the lead sheath might be 0.090 inch, with an allowable maximum and minimum value of 0.099 and 0.081 inch. All the conductors 17 would be connected to the conductor 21 and likewise to the conductor 22. The oscillator 30 would preferably be one adapted to produce in the circuit 21, 17, 22 an alternating current preferably of about 0.05 ampere at 5 kilocycles. The cable core might be one for a 100 pair telephone cable, thus consisting of 200 individual conductors. The switch 28 is thrown down and the switch 35 is thrown to the left. The output of the oscillator 30 is then adjusted to give a predetermined reading on the meter 32, that is, to make a predetermined current pass through the attenuator 34 and the switch 35 to the detector 41. With this calibrating voltage impressed on the input terminals of the attenuator 40 the latter is adjusted until the meter in the output circuit of the detector amplifier 41, which is calibrated in one thousandths inch sheath thickness units, indicates a lead thickness of 0.090 inch. The switch 28 is then closed upwardly and the switch 35 is closed to the right.

The calibrating voltage as produced by the oscillator 30 in the calibrating operation just described is that which has been previously predetermined to be equal to the voltage which the search coil 38 impressed on the input terminals of the attenuator 34 when the coil was applied to a standard sample of similar cable having a sheath known by direct measurement to be 0.090 inch thick.

With the switch 28 then closed upwardly and the switch 35 closed to the right, the output of the oscillator passes through the conductors of the cable and induces an electrical field surrounding the conductors of the cable core and passing outwardly through the sheath to affect the coil 38. Thus the coil 38 impresses an attenuating voltage on the indicating amplifier which is found to be substantially a simple single valued function of the thickness of the sheath, i. e., to be substantially independent of other factors so long as at least nine-tenths of the conductors 17 are in the field inducing circuit.

The resistances 26 and 27 are so proportioned that the oscillator 30 will be correctly terminated. The resistance of the conductors 17 is negligible as compared with the sum of the resistances 26 and 27. Hence the impedance in the oscillator output circuit when the switch 28 is closed upwardly is constant and effectively independent of the length of cable tested. The resistance 29 is equal to the resistance of the heater element of the thermocouple 31 so that the impedance across the center contacts of the switch 28 is constant for any circuit condition.

The various elements of the attenuator 34 are so constructed and adjusted that the impedance from the switch 28 to the switch 35 is the same as the impedance of the test circuit from 26 through the tested cable to the resistance 27. The electrostatic shields 24 and 25 are provided in order to keep the capacitance to ground constant.

The embodiment of the invention herein disclosed is illustrative only and may be widely modified and departed from in many ways without departing from the spirit and scope of the invention as pointed out in and limited solely by the appended claims.

What is claimed is:

1. An apparatus for measuring the thickness of a metal sheath surrounding and insulated from a conductor, comprising a search coil, means to maintain the coil at a constant distance from the outer surface of the sheath, means to effect relative motion of the coil and sheath longitudinally of the sheath and the conductor, means to pass an alternating current of high frequency through the conductor and to pass the same current alternatively to an attenuator for calibrating the same, and means to connect an amplifier detector alternatively to the attenuator or to the coil.

2. An apparatus for continuously measuring the thickness of a metal sheath surrounding and insulated from a conductor, which comprises a search coil to be applied to the outer surface of the sheath, an amplifier detector, means to supply alternating electrical current, an attenuator, means to connect the current supply means alternatively to the conductor or to the attenuator, and means to connect the amplifier detector alternatively to the attenuator or to the coil.

3. In an apparatus for measuring the thickness of a metal sheath surrounding and insulated from a conductor, means to create an electrical field surrounding the conductor and passing through the sheath, which means comprises a vacuum tube oscillator, a resistance connected to one terminal of the oscillator and to one end of the conductor, an auxiliary conductor connecting the other terminal of the vacuum tube oscillator to the other end of the conductor, a thermocouple applied to the auxiliary conductor, and a volt meter connected to the thermocouple.

4. An apparatus for measuring the thickness of a metal sheath surrounding and insulated from a conductor, which comprises a vacuum tube oscillator, an attenuator, an amplifier detector, a search coil to be applied to the outer surface of the sheath, a switch to connect the oscillator alternatively to the conductor or to the attenuator, and a second switch to connect the amplifier detector alternatively to the attenuator or to the coil.

5. An apparatus for measuring the thickness of a metal sheath surrounding and insulated from a conductor, which comprises a source of alternating current, an amplifier detector, a search coil to be applied to the sheath, an operating circuit including the conductor, a detector calibrating circuit, means to connect the source alternatively to the operating circuit to energize the same or to the calibrating circuit to energize the same, and means to connect the amplifier detector alternatively to the calibrating circuit or to the coil.

6. A search device to be applied to a metal sheath surrounding and insulated from an electrical conductor, the said device comprising a block of insulating material to be applied to the sheath, a recess in the block open against the sheath, a coil housed in the recess, a heat insulating member interposed between the sheath and the coil in the recess, and resilient means to press the coil against the member.

7. An apparatus for measuring the thickness of metallic sheet material, which comprises an insulated conductor to be positioned on one side of the sheet at a constant distance from the surface thereof, a search coil to be placed on the other side of the sheet at a constant distance thereof, a source of alternating electrical current, an attenuator, an amplifier detector, means to connect the source of current alternatively to the conductor or to the attenuator, and means to connect the amplifier detector alternatively to the attenuator or to the coil.

WALTER E. WHITE.